United States Patent [19]

Kephart

[11] Patent Number: 4,911,593

[45] Date of Patent: Mar. 27, 1990

[54] RATCHET DRIVEN THREADED FASTENERS

[76] Inventor: R. Dewain Kephart, Rt. #3, Box 126, Murphy, N.C. 28906

[21] Appl. No.: 346,581

[22] Filed: May 2, 1989

[51] Int. Cl.⁴ ............................................. F16B 23/00
[52] U.S. Cl. ................................... 411/403; 411/407; 411/919
[58] Field of Search ............... 411/407, 402, 403, 405, 411/410, 910, 919, 427, 404, 406, 408; 81/460, 461, 436, 451, 448, 52, 475

[56] References Cited

U.S. PATENT DOCUMENTS

| | | | |
|---|---|---|---|
| 288,923 | 11/1883 | Cole | 411/402 |
| 785,449 | 3/1905 | Thompson | 411/402 X |
| 2,169,460 | 8/1939 | Broughton | 411/403 X |
| 2,248,695 | 7/1941 | Bradshaw | 411/410 |
| 3,283,638 | 11/1966 | Ansingh | 411/410 |
| 4,272,209 | 6/1981 | Joseph, Jr. | 411/910 X |
| 4,277,107 | 7/1981 | Stone | 411/403 X |

FOREIGN PATENT DOCUMENTS

| | | | |
|---|---|---|---|
| 2451373 | 5/1975 | Fed. Rep. of Germany | 411/403 |
| 48-87452 | 10/1973 | Japan | 411/403 |
| 211159 | 11/1940 | Switzerland | 411/402 |
| 357468 | 9/1931 | United Kingdom | 411/402 |
| 213113 | 6/1984 | United Kingdom | 411/403 |

Primary Examiner—Rodney M. Lindsey
Attorney, Agent, or Firm—Leon Gilden

[57] ABSTRACT

A threaded fastener organization is set forth wherein an axially threaded shank includes an enlarged overlying head wherein the head is provided with a square prismatic recess formed through an upper surface of the head and wherein the recess is formed with planar walls, each aligned parallel to the axis of the threaded shank. Each wall includes a semi-spherical recess for reception and engagement with a detent sphere associated in a conventional ratchet driver.

1 Claim, 1 Drawing Sheet

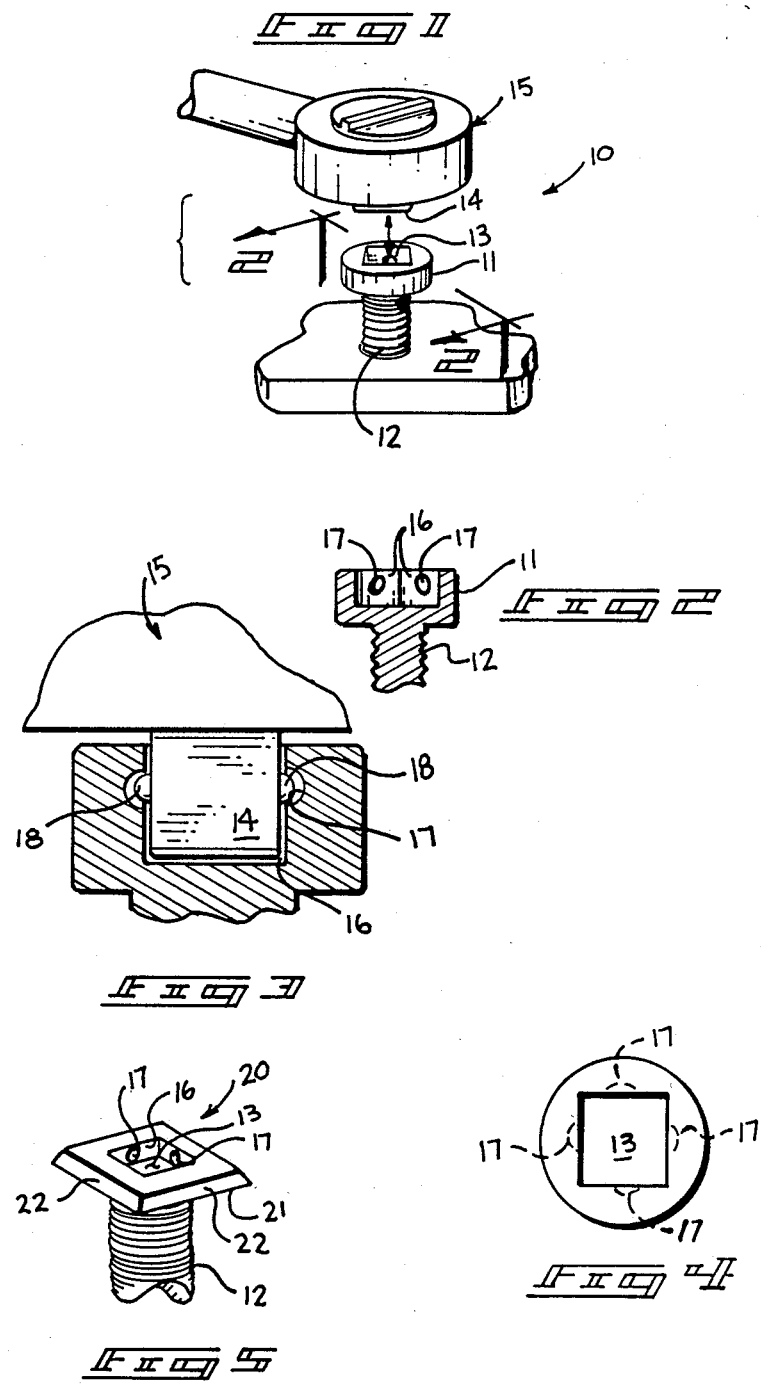

RATCHET DRIVEN THREADED FASTENERS

BACKGROUND OF THE INVENTION

1. Field of the Invention

The field of invention relates to threaded fasteners, and more particularly pertains to a new and improved ratchet driven threaded fastener arrangement wherein the same is provided with a square prismatic recess for reception and engagement with a drive shank of a ratchet driver.

2. Description of the Prior Art

Threaded fasteners and their myriad of applications are well known in the prior art. The threaded fasteners of the prior art have heretofore utilized various recesses mounted through an upper surface of a drive head of the fastener to direct torque to the threaded shank associated with such fasteners. An example may be found in U S. Pat. No. 4,459,074 to Capuano wherein a multi-walled prismatic recess is directed through an upper surface of a threaded fastener with intersecting corners of the walls of the prismatic recess including recesses for the reception of a torque driving tool. The patent is of interest relative to the use of a prismatic recess formed within a threaded fastener, but requires a specialized torque application tool in their use, as opposed to the instant invention employing conventional ratchet wrenches for torque application.

U.S. Pat. No. 4,269,246 to Larson sets forth a threaded fastener including fluted sides for reception and engagement with a like configured torque application tool.

U.S. Pat. No. 4,242,932 to Barmore sets forth a threaded fastener utilizing a planar walled hexagonal recess cavity with a medially and orthogonally oriented boss extending upwardly through the recess for cooperation with a like configured torque application tool.

U.S. Pat. No. 3,888,144 to Parsons sets forth a threaded fastener utilizing a polygonal recess with a central and medially aligned cavity directed axially of the shank for receiving a torque driving tool.

U.S. Pat. No. 4,884,812 to Miyagawa sets forth a screw fastener utilizing a star-shaped socket hole directed through a top surface of the screw wherein the star-shaped recess is oriented for reception of a like configured torque application tool, as is conventional with such specialized threaded fastener members.

As such, it may be appreciated that there is a continuing need for a new and improved ratchet driven threaded fastener arrangement which addresses both the problems of effectiveness in use and applicability with a conventional ratchet drive tool and in this respect, the present invention substantially fulfills this need.

SUMMARY OF THE INVENTION

In view of the foregoing disadvantages inherent in the known types of threaded fasteners now present in the prior art, the present invention provides a ratchet driven threaded fasteners wherein the same are formed with a square prismatic recess for cooperation with a conventional torque application ratchet drive tool. As such, the general purpose of the present invention, which will be described subsequently in greater detail, is to provide a new and improved ratchet driven threaded fastener which has all the advantages of the prior art threaded fasteners and none of the disadvantages.

To attain this, the present invention essentially comprises a category of threaded bolts and threaded screws provided with an axially aligned and threaded shank with an enlarged drive head. The drive head is provided with a square prismatic recess axially aligned with the threaded shank. The planar walls of the prismatic recess are each formed with a semi-spherical recess for reception and engagement of a spherical detent ball utilized in conventional ratchet drive tools. An embodiment of the invention utilizes a square contact surface with tapering walls directed to an upper square surface of a surface area less than the contact surface to minimize engagement with objects as the drive head is oriented above a work piece to be threaded. The threaded fasteners are formed in conventional sizes wherein the prismatic recesses formed through the drive head are in one-quarter inch, three-eighths inch, three-quarter inch, and one inch configurations dependent upon the size of threaded fastener required for a particular application. Further, the threaded fasteners may be formed of either stainless steel for its corrosion resistant characteristics, or of hardened steel, dependent upon need.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ratchet driven threaded fastener which has all the advantages of the prior art threaded fasteners and none of the disadvantages.

It is another object of the present invention to provide a new and improved ratchet driven threaded fastener which may be easily and efficiently manufactured and marketed.

It is a further object of the present invention to provide a new and improved ratchet driven threaded fastener which is of a durable and reliable construction.

An even further object of the present invention is to provide a new and improved ratchet driven threaded fastener which is susceptible of a low cost of manufacture with regard to both material and labor, and which accordingly is then susceptible of low prices of sale to the consuming public, thereby making such ratchet driven threaded fasteners economically available to the buying public.

Still yet another object of the present invention is to provide a new and improved ratchet driven threaded fastener which provides in the apparatuses and methods of the prior art some of the advantages thereof, while simultaneously overcoming some of the disadvantages normally associated therewith.

Still another object of the present invention is to provide a new and improved ratchet driven threaded fastener provided with a square prismatic recess for cooperation with a square drive directed from a conventional torque application ratchet tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in use with a drive tool.

FIG. 2 is an orthographic view taken along the lines 2—2 of FIG. 1 in the direction indicated by the arrows.

FIG. 3 is an enlarged orthographic cross-sectional view through opposed planar wall surfaces of the prismatic recess of the drive head.

FIG. 4 is a top orthographic view of the instant invention.

FIG. 5 is an isometric illustration of a further embodiment of the instant invention.

DESCRIPTION OF THE PREFERRED EMBODIMENT

With reference now to the drawings, and in particular to FIGS. 1 to 5 thereof, a new and improved ratchet driven threaded fastener embodying the principles and concepts of the present invention and generally designated by the reference numeral 10 will be described.

More specifically, the ratchet driven threaded fastener 10 essentially comprises an enlarged drive head 11 formed with a threaded shank 12 extending axially an orthogonally downwardly relative to the drive head 11. The drive head 11 is formed with a drive cavity 13 defined as a square prism whose geometric center and axis is aligned with the shank 12. The drive cavity 13 is configured for the reception of a square drive shank 14 from a conventional ratchet drive tool 15 that is simply formed with at least one spring biased detent sphere 18 projecting outwardly through a side wall of the drive shank 14.

The drive cavity 13 includes four planar wall surfaces 16, each containing a semi-spherical recess 17 medially of each wall surface 16 to receive the aforenoted detent sphere or spheres 18 of the drive shank 14.

FIG. 5 is illustrative of a modification of the drive head wherein the further drive head 20 includes a bottom contact surface 21 of a first square configuration including trapezoidal side walls 22 apering to a top surface 28 of a second square configuration defining a surface area less than that of the first square configuration to provide a tapered head that is resistant to engagement with objects of individuals when the further drive head 20 projects above a work piece.

It is understood that the drive cavities 13 are formed to accommodate drive shanks of one-quarter inch, three-eighths inch, one-half inch, three-quarter inch, and one inch configurations to accommodate ratchet drive tools 15 of similar prismatic configurations. Also the thread sizes utilized are contemplated to be within conventional metric and SAE sizes and in the selective use of stainless steel or hardened steel, dependent upon application and need.

As to the manner of usage and operation of the instant invention, the same should be apparent from the above disclosure, and accordingly no further discussion relative to the manner of unsafe and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A threaded fastener comprising,
    an axially aligned threaded shank of a finite length including an enlarged drive head integrally secured to an upper end of the threaded shank wherein the drive head includes a prismatic cavity axially aligned with the threaded shank and directed through an upper planar surface of the drive head interiorly of the drive head, and
    wherein the prismatic cavity is defined by a square prism, and each wall of the prism is defined as a planar wall aligned parallel to an axis defined by the threaded shank, and
    wherein each planar wall includes a semi-spherical recess positioned medially of each planar wall and directed interiorly of each planar wall into the drive head, and
    wherein the drive head includes a first square contact surface arranged adjacent the threaded shank and wherein the upper planar surface of the drive head is arranged as a second square surface wherein the second square surface defines a square perimeter less than a square perimeter defined by the first square surface, and
    wherein each side wall arranged between the first perimeter and the second perimeter is defined as a trapezodial surface.

* * * * *